United States Patent

[11] 3,599,575

[72] Inventors: Frank R. Yurkoski, Bridgeton; Philip J. De Frank, Hazelwood, both of, Mo.
[21] Appl. No.: 831,418
[22] Filed: June 9, 1969
[45] Patented: Aug. 17, 1971
[73] Assignee: ACF Industries, Incorporated, New York, N.Y.

[54] WEAR RESISTANT SURFACE FOR POLYURETHANE FOAM MATERIAL ON SURFACE OF RAILWAY CAR
1 Claim, 5 Drawing Figs.

[52] U.S. Cl. .................................................. 105/358, 280/5 R, 296/31, 220/9
[51] Int. Cl. .................................................. B61d 5/00, B61d 5/04
[50] Field of Search .......................................... 238/14; 105/358, 360; 280/5; 296/31 P; 220/9 F; 214/45

[56] References Cited
UNITED STATES PATENTS

| | | | |
|---|---|---|---|
| 2,011,076 | 8/1935 | Prescott | 105/360 |
| 2,907,284 | 10/1959 | Folmsbee | 105/360 |
| 2,980,972 | 4/1961 | Kloote et al. | 105/360 |
| 3,036,342 | 5/1962 | Fino | 264/45 |
| 3,139,842 | 7/1964 | Moyes et al. | 105/360 |
| 3,158,383 | 11/1964 | Anderson et al. | 105/360 |
| 3,202,358 | 8/1965 | Griswold | 238/14 |

Primary Examiner—Arthur L. La Point
Assistant Examiner—Richard A. Bertsch
Attorney—Eugene N. Riddle ABSTRACT: An insulated covered hopper railway car having a layer of rigid polyurethane foam applied on the outer surface thereof by spraying in place. An outer coat of a polyester resin is applied, such as by manual brushing, onto the outer surface of the polyurethane foam material on certain areas of the polyurethane foam material which are exposed to wear and abrasion, such as roof areas adjacent the walkway or running board and areas between the separate hatch covers. A layer of fibrous material, such as woven fiberglass, is then positioned on the coat of polyester resin. Then, the fibrous material is brushed and rolled to remove any air and to embed the material in the coat of polyester resin. The resin is then allowed to gel and cure which will be around 45 minutes at 77° F.

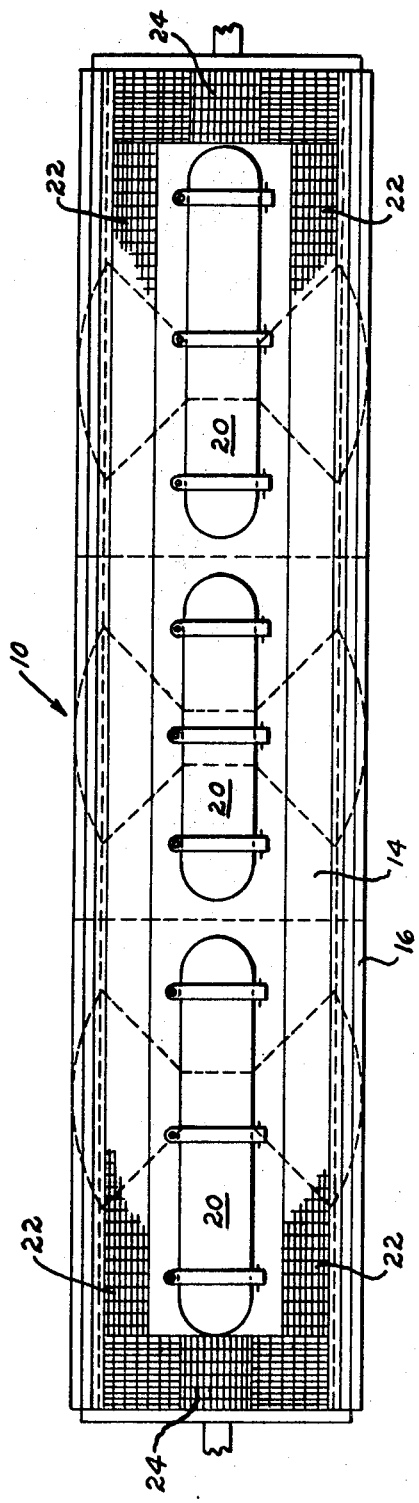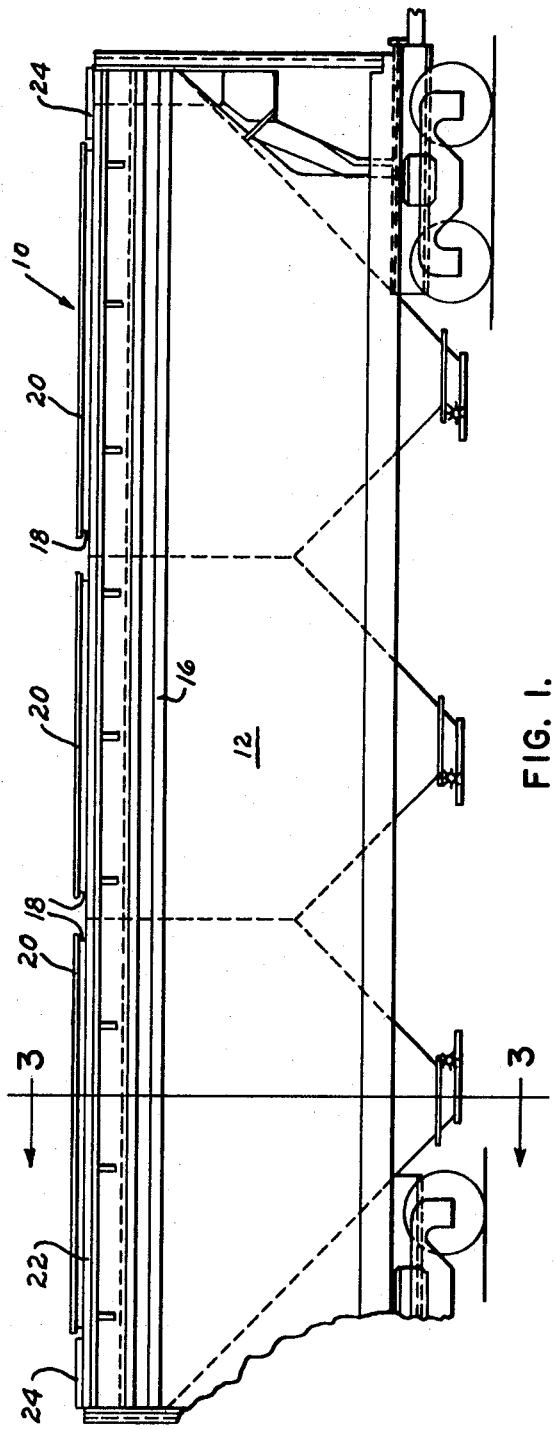
INVENTORS.
FRANK R. YURKOSKI
PHILIP J. DeFRANK
BY Eugene N. Biddle
ATTORNEY

WEAR RESISTANT SURFACE FOR POLYURETHANE FOAM MATERIAL ON SURFACE OF RAILWAY CAR

BACKGROUND AND DESCRIPTION OF THE INVENTION

Covered hopper railway cars have been insulated heretofore, by applying a layer of rigid polyurethane foam material by spraying onto the exterior surface of a covered hopper railway car. When rigid polyurethane foams are exposed on the exterior surface of a railway car, certain areas are subjected to abrasion and deterioration of the foam material, such as areas adjacent the walkway on the roof of a car which workmen may walk or stand on. The polyurethane foam material tends to chip away when subjected to such contact and resulting wear.

The present invention provides a protective covering for rigid polyurethane foam materials on the outer surface of railway cars to minimize any damage or deterioration of the foam material. The protective covering is provided by brushing a coating of the polyester resin onto the polyurethane foam material. A catalyst and a promoter are mixed with the polyester resin before the resin is applied. After the polyester resin coating is applied, a layer of fibrous material is applied and embedded in the resin. Then the resin is allowed to gel and cure for approximately 45 minutes at 77° F.

The invention accordingly comprises the constructions hereinafter described, the scope of the invention being indicated in the following claims.

In the accompanying drawings, in which one of various possible embodiments of the invention is illustrated, FIG. 1 is a side elevation of a covered hopper railway car before the insulating material is placed thereon;

FIG. 2 is a top plan of the covered hopper railway car shown in FIG. 1;

Corresponding reference characters indicate corresponding parts throughout the several views of the drawings.

Figure 3:
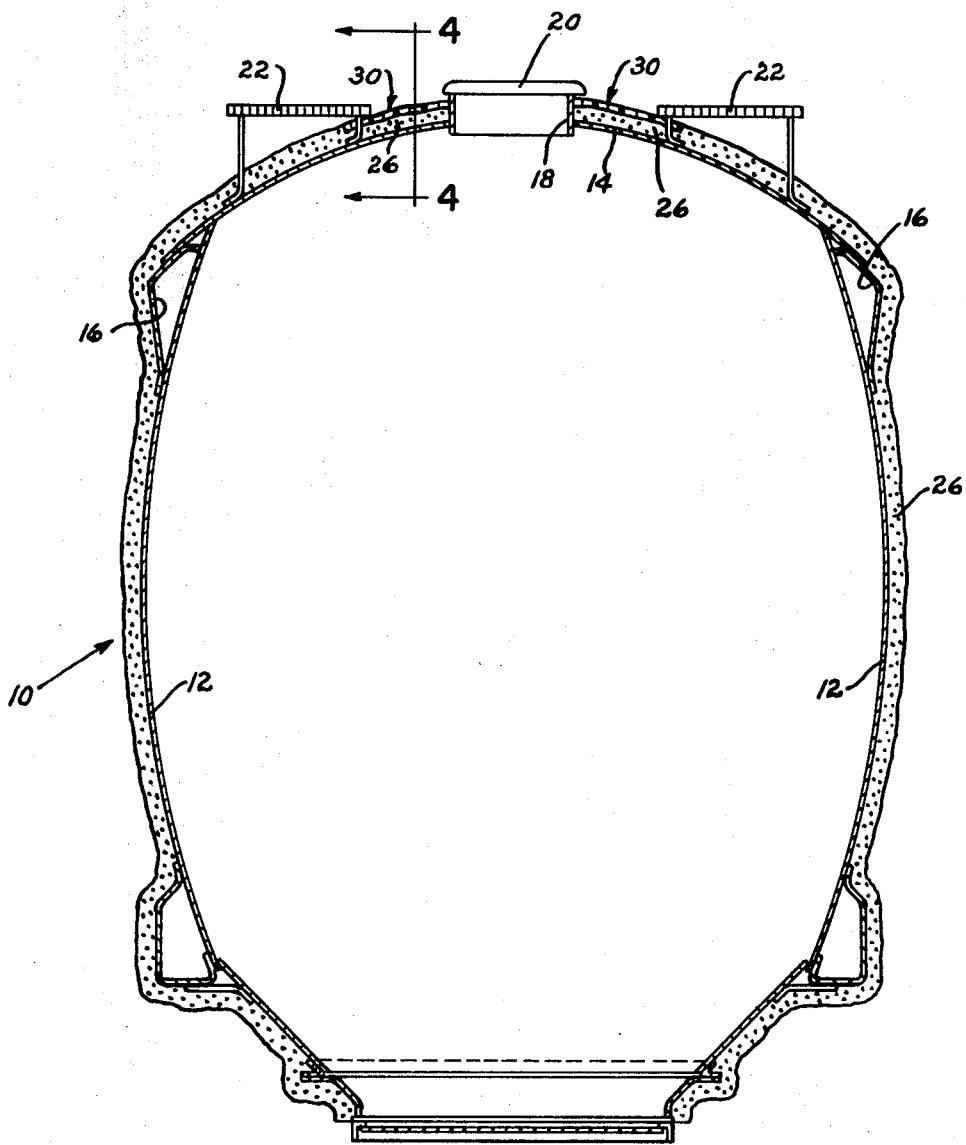
FIG. 3 is a sectional view taken generally along line 3–3 of FIG. 1 but indicating the insulating material and protective covering on the railway car, the protective covering being positioned on the roof between the hatch covers and the adjacent walkway.

Referring now to the drawings for a better understanding of this invention, a covered hopper railway car is generally indicated 10 having opposed side sheets 12 connected by a roof 14. Sideplate structures 16 extend along the upper marginal portions of side sheets 12 and roof 14 is secured thereto. An elongate hatch ring 18 is mounted within an opening in roof 14 and a hatch cover 20 is mounted thereon. As shown in FIGS. 1 and 2, three hatch rings 18 and associated hatch covers 20 are provided on each railway car 10. To permit workmen on the roof 14 of railway car 10, a walkway having sides 22 connected by ends 24 is mounted about hatch covers 20 as shown clearly in FIG. 2. The workmen may open and close hatch covers 20 while supported on adjacent walkways 22.

To insulate covered hopper railway car 10 for the transport of certain commodities, a layer of polyurethane foam material is sprayed onto the exterior surface of car 10 and is indicated generally by numeral 26 in FIG. 3. As the polyurethane material 26 is usually sprayed manually, an uneven thickness of material sometimes develops. Further, certain areas of the insulating material 26 are subject to abrasion which results in deterioration or a chipping-off of the foam material. The area between walkways 22 and hatch covers 20 is a high abrasive area since workmen sometimes step or walk on this area when opening or closing hatch covers 20. Thus, the present invention is particularly adaptable for use on an area such as that shown between walkways 22 and hatch covers 20.

Figure 4:
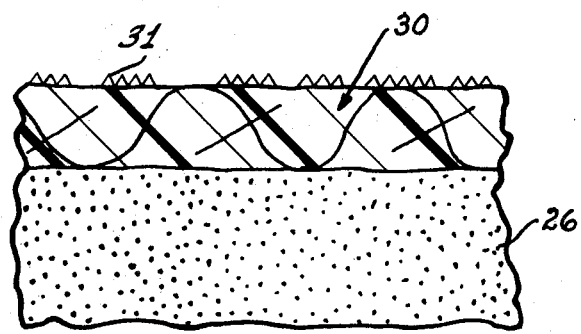
FIG. 4 is an enlarged section taken generally along line 4–4 of FIG. 3 and illustrating the protective covering over an exterior polyurethane foam material on the outer surface of the covered hopper railway car; and, FIG. 5 is an enlarged plan of a fibrous material which is embedded in a polyester resin to form the protective covering.
Figure 5:
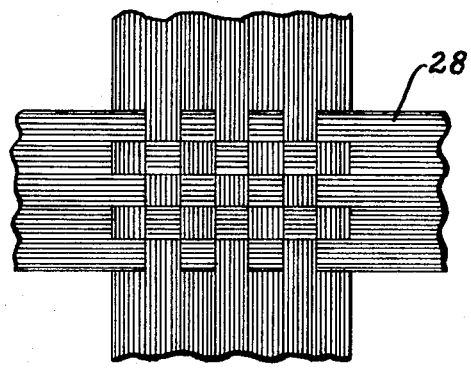

For applying the protective covering or polyester laminate over insulating material 26, a polyester resin is mixed with a catalyst and a promoter, such as benzoyl peroxide, in one container. As a specific but nonlimiting example, 100 pounds of polyester resin is suitably mixed with 2 pounds of a benzoyl peroxide paste comprising the catalyst and 0.6 pound of diethyl aniline comprising the promoter. The mixture is brushed onto the outer surface of the rigid polyurethane insulating foam material 26 between hatch covers 20 and walkways 22 to form a coating of polyester resin on the foam material. After the polyester resin has been applied to the rigid foam material 26 adjacent walkways 22, fibrous material 28 shown in FIG. 5, such as a woven roving fiber glass, is cut into suitable lengths and placed over the polyester resin. Fibrous material 28 is then rolled and brushed to embed the material within the resin and to remove any air. The material is allowed to cure for around 45 minutes at 77° F. to form the laminate 30. If desired to provide an antiskid surface coarse dry sand indicated by numeral 31 in FIG. 4 may be sprinkled on the surface of the laminate after fibrous material 28 has been rolled and properly embedded within the polyester resin. Then, the polyester laminate cures with the dry sand embedded on its surface.

The insulating foam material 26 is around 2 inches in thickness but may vary from around one-half inch in thickness to 4 inches. Polyester laminate 30 is around one-eighth inch in thickness but may vary from around one-sixteenth to one-fourth inch in thickness. Fibrous material 28 preferably comprises a woven roving fiberglass having a thickness of around one-twentieth inch and a weight of around 24 ounces per square yard. The fiber glass woven material may be between one-thirtieth inch and one-tenth inch in thickness.

While the invention has been shown as applied specifically to the area between hatch covers 20 and walkways 22, it is understood that other areas may be provided with such a protective covering, if desired.

In view of the above, it will be seen that the several objects of the invention are achieved and other advantageous results obtained.

What we claim is:

1. In a covered hopper railway car having a roof, a walkway on said roof, a hatch cover on said roof spaced from the walkway, and a rigid polyurethane foam material of a thickness over 1 inch on the outer surface of the roof; the improvement of an outer protective covering secured to the outer surface of the rigid foam material on the roof between the hatch cover and the walkway and comprising, a polyester resin of a thickness between about one-sixteenth inch and one-fourth inch on the outer surface of the foam material, a layer of woven fiber glass roving having a thickness between one-thirtieth inch and one-tenth inch embedded in the resin to form a resin laminate, and a particulate material on the outer surface of the resin laminate to provide a skid-resistant surface between the hatch cover and the walkway; said protective covering being formed by the following steps: applying the polyester resin on the outer surface of the rigid foam material, applying the layer of fiber glass roving to the outer surface of the polyester resin, rolling the fiber glass roving to embed the roving within the resin to form the resin laminate and to remove entrapped air, and sprinkling the particulate material on the outer surface of the resin laminate thus formed.